US005863439A

United States Patent [19]

Dietz et al.

[11] Patent Number: 5,863,439
[45] Date of Patent: Jan. 26, 1999

[54] PROCESS FOR SEPARATION AND PRECONCENTRATION OF RADIUM FROM WATER

[75] Inventors: Mark Dietz, Elmhurst; E. Philip Horwitz, Naperville; Renato Chiarizia, Elmhurst, all of Ill.; Richard A. Bartsch, Lubbock, Tex.

[73] Assignee: Arch Development Corporation, Chicago, Ill.

[21] Appl. No.: 870,914

[22] Filed: Jun. 6, 1997

[51] Int. Cl.[6] ........ C02F 1/42

[52] U.S. Cl. ........ 210/682; 210/723; 210/754; 210/772; 423/6; 423/8; 423/DIG. 14; 976/DIG. 383

[58] Field of Search ........ 210/681, 682, 210/723, 754, 772; 423/6, 7, 8, DIG. 14; 976/DIG. 383

[56] References Cited

U.S. PATENT DOCUMENTS

| | | | |
|---|---|---|---|
| 4,431,609 | 2/1984 | Scheitlin | 210/682 |
| 4,726,938 | 2/1988 | Rollat et al. | 423/DIG. 14 |
| 4,917,825 | 4/1990 | McDowell et al. | 423/DIG. 14 |
| 5,076,936 | 12/1991 | Metz | 210/682 |
| 5,196,124 | 3/1993 | Connor et al. | 210/682 |
| 5,322,644 | 6/1994 | Dunn et al. | 210/682 |
| 5,702,608 | 12/1997 | Foos et al. | 210/682 |
| 5,728,302 | 3/1998 | Connor et al. | 210/682 |

OTHER PUBLICATIONS

Türler, A. et al., *Radiochim. Acta*, 43:149–152 (1988).
Benzi, P. et al., *Nucl. Chem. Lett.*, 164:211–220 (1992).
Volpe, A.M. et al., *Anal. Chem.*, 63:913–916 (1991).
Yamamoto, M. et al., *Radiochim. Acta*, 55:163–166 (1991).
Clifford, D.A. et al., *Health Phys.*, 62:413–422 (1992).
Horwitz et al., *Analytica Chimica Acta*, 283:361–372 (1993).

*Primary Examiner*—Jay H. Woo
*Assistant Examiner*—Betsey J. Morrison
*Attorney, Agent, or Firm*—Welsh & Katz, Ltd.

[57] ABSTRACT

A process for preconcentrating and separating radium from a contaminated solution containing at least water and radium includes the steps of adding a quantity of a water-soluble macrocyclic polyether to the contaminated solution to form a combined solution. An acid is added to the combined solution to form an acidic combined solution having an $[H^+]$ concentration of about 0.5M. The acidic combined solution is contacted with a sulfonic acid-based strong acid cation exchange medium or a organophilic sulfonic acid medium having a plurality of binding sites thereon to bind the radium thereto and to form a radium-depleted solution. The radium-depleted solution is separated from the strong acid cation exchange medium or organophilic sulfonic acid medium. The radium remaining bound to the exchange medium or organophilic reagent is then stripped from the exchange medium or organophilic medium and the activity of the radium is measured.

12 Claims, 11 Drawing Sheets

D
[18C6], M
10^5
10^4
10^3
10^2
10^1
10^-4
10^-3
10^-2
10^-1

[18C6], M

[18C6], M

PROCESS FOR SEPARATION AND PRECONCENTRATION OF RADIUM FROM WATER

GOVERNMENTAL RIGHTS

This invention was made with governmental support pursuant to Contract No. W-31-ENG-109 between the U.S. Department of Energy and The Argonne National Laboratory. The government has certain rights in this invention.

FIELD OF THE INVENTION

This invention relates to a process for the separation and preconcentration of radium cations from water. More particularly, this invention relates to a process for the separation and preconcentration of radium-226 and radium-228 cations from water using a strong acid cation exchange medium and a water-soluble, macrocyclic polyether.

BACKGROUND OF THE INVENTION

The radium content in water supplies has come under intense scrutiny since the early 1980s, following the announcement by the U.S. Environmental Protection Agency of an acceptable upper limit for the radium content in drinking water of 5 picocuries per liter (5 pCi/L). It has been shown through recent surveys that this limit is exceeded in many communities, particularly those communities that obtain their drinking water from wells.

Radium-226 (Ra-226) and radium-228 (Ra-228), which are products of the uranium-238 and thorium-232 decay chains, respectively, are of particular environmental concern. Ra-226 has a half-life of 1600 years and is among the most toxic long-lived alpha emitters present in environmental samples. Thus, considerable interest has developed in improving methods for its determination. Likewise, interest has also developed in improving methods for determining levels of Ra-228 in water and other samples.

Because of the low levels of radium generally encountered in such environmental samples, radium determination generally requires a preliminary preconcentration and separation step to isolate the radium from comparatively large quantities of inactive substances and to free the radium from other radioisotopes that may interfere with subsequent counting. In a typical process, this separation and preconcentration step involves co-precipitating the radium with barium and/or lead sulfate. Following washing, the precipitate can be subjected to other treatments to further reduce the number of other radio-nuclides present or to reduce the quantity of the carrier present in the sample. Although such methods are generally effective, they can be tedious, particularly the precipitation step or steps.

In addition, radium levels in many barium reagents are not negligible, relative to the levels to which the radium is tested in the samples, which can require a preliminary purification of the reagents to reduce what is commonly referred to as "blank" levels. Moreover, when the precipitate containing radium is counted by alpha spectrometry without further treatment, the precipitation conditions must be carefully controlled to avoid degradation of the alpha spectrum.

Extraction chromatography has been used as one method for separating and preconcentrating radium from samples. In one method, a complex scheme has been developed for separating radium and various actinides from copper foils using a column of bis(2-ethylhexyl)phosphoric acid (HDEHP) sorbed on Celite® 535. A. Türler et al., *Radiochim. Acta* 1988, 43, 149–52. The uptake of radium by several podands and macrocyclic polyethers supported on either Amberlite® XAD resin or Kieselgel has also been recently examined. Radium uptake was observed to be both low and irreproducible using the supported macrocyclic polyethers. Similar unsatisfactory results were achieved using open-chain extractants. P. Benzi et al., *Nucl. Chem. Lett.* 1992, 164, 211–20.

Ion exchange techniques have also been used to separate and preconcentrate radium cations from various samples. In one procedure, three separate, successive cation exchange columns were used to isolate radium from geologic samples for subsequent mass spectrometry. A. M. Volpe et al., *Anal. Chem.* 1991, 63, 913–16. In another procedure, a combined anion/cation exchange method was used to isolate Ra-226 from human bone ash for subsequent electrodeposition and alpha spectrometry. M. Yamamoto et al., Radiochim Acta 1991, 55, 163–66. A single column procedure has been used to isolate radium from drinking water samples, using a strong cation exchange resin and gamma spectrometry. D. A. Clifford et al., *Health Phys.* 1992, 62, 413–22.

Regardless of the ion exchange procedure used, such methods, like other techniques, suffer from various limitations, and particularly, suffer from inadequate selectivity and the need for additional cumbersome sample treatment steps if the analysis involves the determination of Ra-228.

Accordingly, there continues to be a need for a simple process for selectively separating and preconcentrating Ra-226 and Ra-228 from aqueous samples. Such a process permits radium separation and preconcentration without sacrificing radium selectivity, and without the need for cumbersome sample pretreatment steps. In particular, such a method permits radium separation without requiring co-precipitating steps with various reagents that can later contaminate the sample. The disclosure that follows illustrates one such simple process for selectively separating and preconcentrating radium cations.

SUMMARY OF THE INVENTION

A process for preconcentrating and separating radium cations from a contaminated sample that contains water along with radium and calcium cations and can also contain one or both of barium and strontium cations is contemplated. The process comprises the steps of admixing a quantity of a water-soluble macrocyclic polyether to the contaminated solution to form a combined solution, admixing a sufficient amount of an acid to the combined solution to form an acidic combined solution having a hydrogen ion [$H^+$] concentration of about 0.5M, contacting the acidic combined solution with a sulfonic acid-based strong acid cation exchange medium to bind the radium cations thereto and to form a radium-depleted solution, and separating the radium-depleted solution from the strong acid cation exchange medium.

In a preferred process, the macrocyclic polyether is 15-Crown-5, 18-Crown-6, 21-Crown-7 or 30-Crown-10 (15C5, 18C6, 21C7 or 30C10), and is added to the contaminated solution to form a combined solution having a macrocyclic polyether concentration of about $10^{-3}$M to about $10^{-1}$M. Most preferably, the macrocyclic polyether is 18-crown-6.

The process can be carried out in a solid-liquid phase separation system or a liquid-liquid phase separation system. In the solid-liquid phase system, the cation exchange medium can be a macroporous sulfonic acid-based resin. The solid-liquid system can include a chelating agent added thereto to prevent sorption by the resin of actinide ions, such as plutonium, uranium and the like.

In a preferred solid-liquid system, after contact between the acidic combined solution (during which the radium cations are sorbed on the resin), the exchange medium is rinsed with water. The radium cations are stripped from the resin by contact with a strong acid strip solution, such as 4.0M nitric acid.

The liquid-liquid separation system contains a water phase and a water-immiscible organic phase wherein the sulfonic acid-based strong acid cation exchange medium is an organophilic sulfonic acid dissolved in an organic diluent. One such organophilic sulfonic acid is dinonylnaphthalenesulfonic acid (HDNNS). Exemplary organic diluents are o-xylene, diethylbenzene and diisopropylbenzene. The initial water phase constitutes the contaminated sample, is adjusted to an acid concentration of about 0.5M $[H^+]$ and has the crown ether added thereto.

Other features and advantages of the present invention will be apparent from the following detailed description, the accompanying drawings, and the appended claims.

DETAILED DESCRIPTION OF THE PREFERRED EMBODIMENTS

Figure 1A:
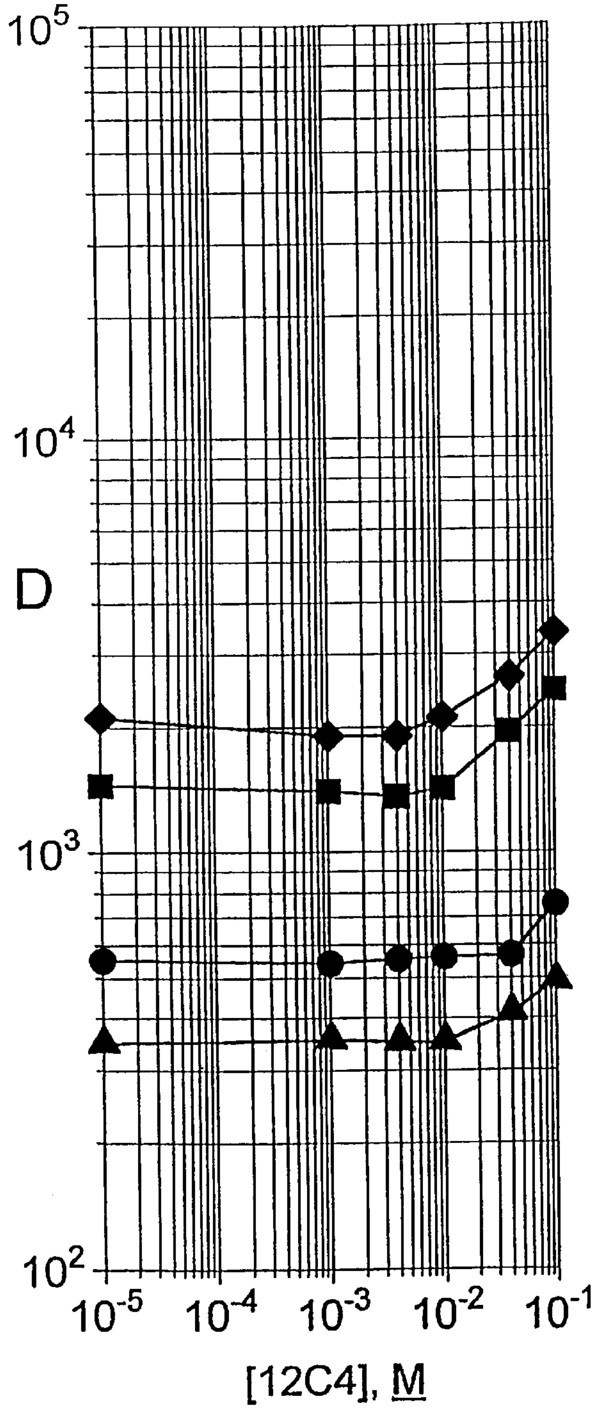
FIGS. 1A–1G are graphic illustrations of the distribution values (D) of radium (Ra, diamonds), barium (Ba, squares), strontium (Sr, circles), and calcium (Ca, triangles) cations in a solid-liquid phase separation system wherein the solid phase is Bio-Rad® AG 50W-X8 ion exchange resin and the aqueous liquid phase has a hydrochloric acid concentration of 0.5M and wherein the concentration of the selected crown ether (12C4, 15C5, 18C6, 21C7, 24C8, 27C9 and 30C10, in FIGS. 1A–G, respectively) is shown on the abscissa.
Figure 1B:
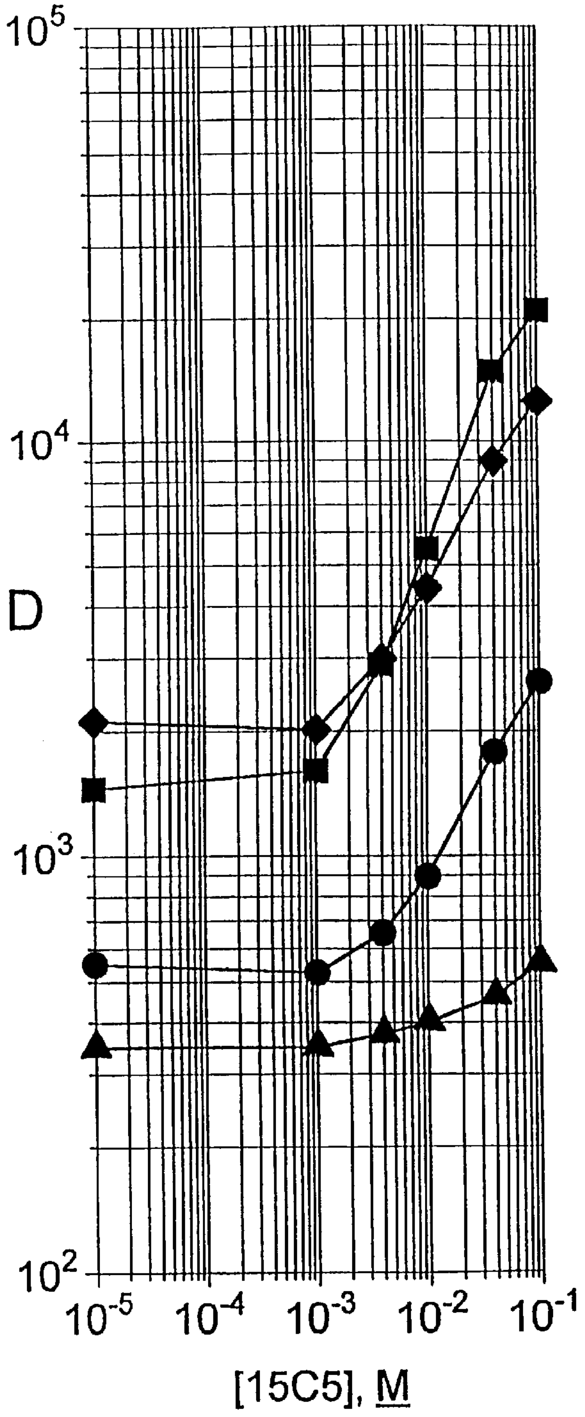

Although the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

A process for preconcentrating and separating radium cations from a sample of a contaminated acidic aqueous solution also containing calcium cations that can also contain one or both of barium and strontium cations is contemplated. That process comprises admixing a relatively small amount of a water- soluble macrocyclic polyether (referred to herein as "crown ether" or "CE") to the aqueous sample and contacting the sample with a strong acid cation exchange medium. Preferably, the crown ether is added to a concentration of about $10^{-1}$M to about $10^{-3}$M and most preferably to a concentration of about $3\times10^{-3}$M. A contemplated water-soluble crown ether has a minimal solubility in distilled or deionized water at 20° C. of about $10^{-3}$M or more.

Many common water samples, and in particular water samples taken from wells and potable water supplies, contain significant amounts of sodium, potassium, magnesium and calcium cations. Unexpectedly, a contemplated crown ether significantly increases the uptake by the exchange medium of the selected "larger" cations of radium and barium relative to the "smaller" cations of magnesium, strontium and calcium.

Because these "smaller" elemental (lower atomic weight) cations are prevalent in common water samples and because they often behave similarly to the larger ions of radium and barium, it is beneficial that these smaller cations be selectively precluded from sorption by the exchange medium. In the present process, the larger alkaline earth cations of radium and barium are sorbed by the exchange medium in preference to the smaller alkaline earth cations by the addition of the crown ether.

The process can be carried out in a solid-liquid system, wherein the liquid aqueous phase is contacted with a solid exchange medium such as an ion-exchange resin. When separation is carried out in the solid-liquid system, in order to avoid sorption of cations of actinide metals, such as uranium, plutonium and americium, on the exchange resin, a chelating agent can be added to the sample. Preferably, a non-hazardous chelating agent such as ammonium citrate is used to reduce the uptake of these actinide metal cations.

After addition of the chelating agent, the sample is adjusted to be slightly acidic. In a preferred process, the sample is adjusted to an acid concentration ($[H^+]$) of about 0.5M using concentrated aqueous hydrochloric acid as is described in greater detail hereinafter. The acidified sample is then contacted with the strong acid cation exchange medium.

One preferred solid phase supported exchange resin is Bio-Rad® 50W-X8 resin in the $H^+$ form, which is commercially available from BioRad Laboratories, Inc., of Richman, Calif. Other useful strong acid cation exchange media include the Dowex® 50W series of ion exchange resins and the Amberlite® IR series of ion exchange resins that are available from Sigma Chemical Co., St. Louis, Mo.

Another resin that can be used in the present process is a styrene-divinyl benzene polymer matrix and includes sulfonic and gem diphosphonic acid functional groups chemically bonded thereto. Such a resin is commercially available from Eichrom Industries, Inc., of Darien, Ill., under the name Diphonix® brand resin. In the present process, the Diphonix® resin is used in the $H^+$ form.

Alternately, the process can be carried out in a liquid-liquid system in which the exchange medium is carried in a non-aqueous, water-immiscible, organic-based liquid phase that is contacted with the aqueous liquid phase sample having the crown ether added thereto. Preferably, the extractant is a sulfonic acid-based extractant such as dinonylnaphthalenesulfonic acid (referred to herein as HDNNS) dissolved in or carried by xylene or di-isopropylbenzene as solvent.

The crown ethers that have been found to be particularly useful in increasing the uptake of radium and barium relative to calcium, in both a liquid-liquid phase system and in a liquid-solid phase system include 15-crown-5 (15C5), 18-crown-6 (18C6), and 21-crown-7 (21C7) The crown ether is added to the aqueous solution to a final crown ether concentration of about $10^{-1}$M to about $10^{-3}$M. In a preferred process, the crown ether concentration is about $3 \times 10^{-3}$M. The crown ethers are those crown ethers that have only a macrocyclic ring system.

Advantageously, such crown ethers, and in particular, the smaller crown ethers (e.g., 15C5 and 18C6) are relatively low cost reagents that provide a cost effective and procedurally efficient method for separating radium cations from water samples that contain calcium cations and that can also contain one or both of strontium and barium cations.

In carrying out the present process using the solid phase extractant; i.e., an ion exchange resin, the crown ether is added to the sample to a concentration of about $10^{-3}$M and preferably about $3 \times 10^{-3}$M. A chelating agent, such as ammonium citrate can be added to the sample to limit sorption of actinide metal cations, such as plutonium, uranium and americium, by the resin. Those skilled in the art will recognize the tendency of the chelating agent to form a stable complex or complexes with such actinide metals. This complex formation inhibits the binding or sorption of the actinides by the cation exchange medium.

The acidity of the sample is then adjusted to a hydrogen ion ($[H^+]$) concentration between about 0.5M and about 1.0M. Where no chelating agent is used, the hydrogen ion concentration can be adjusted prior to admixture of the crown ether. As will be discussed and illustrated herein, the above acidity of the sample favors sorption of the larger alkaline earth cations; i.e. radium, barium and strontium, by the ion exchange resin over elution of the cations from the resin.

After the sample is contacted with the resin to bind the cations, the resin is rinsed with either water or an aqueous solution of about 0.5M hydrochloric acid to improve the separation of radium and barium cations from strontium and or calcium cations on the resin. After the rinse solution is removed from the resin, essentially only the radium (Ra-226 and -228) and barium cations remain sorbed on the resin.

The radium cations, both Ra-226 and -228, as well as the barium cations, are stripped from the column using a strong acid strip solution (referred to herein as the radium strip solution), preferably an aqueous nitric acid solution having a concentration of at least about 3.0M and most preferably about 4.0M. The activity of the Ra-226 cations in the radium strip solution is then determined by methods that are well known to those skilled in the art.

If an analysis of the Ra-228 initially in the sample (now in the radium strip solution) is also desired, its daughter decay product actinium-228 (Ac-228) is readily isolated for counting. Thus, for example, the strip solution is maintained for a suitable period of time for a portion of the Ra-228 to decay to Ac-228. Generally, maintaining the solution overnight (about 18 hours) suffices to “grow” the Ac-228.

The radium strip solution that has been so “grown” contains radium and Ac-228 and is passed through a subsequent exchange medium, such as an extraction chromatographic resin to bind the Ac-228 thereto, and to pass the radium. One such extraction chromatographic resin comprises CMPO [octyl(phenyl)-N,N-diisobutylcarbamoylmethylphosphine oxide] at 0.75M in tri-n-butyl phosphate supported on a non-reactive (inert) polymeric support such as Amberlite® XAD-7 or Amberchrom™ CG-71, as discussed in Horwitz et al., *Analytica Chimica Acta* 1993, 283, 361–372. A preferred extraction chromatographic resin is TRU™ resin available from Eichrom Industries, Inc., of Darien, Ill.

The Ac-228 is recovered from the extraction chromatographic resin by using an aqueous acidic actinium strip solution of, for example, 1.0M hydrochloric acid, and the activity of the Ac-228 is measured accordingly. Based upon the time that the Ac-228 is permitted to “grow” and the activity of the Ac-228 recovered from the resin, the initial activity of the Ra-228 can be determined.

It may also be desired to separate strontium-90 (Sr-90) from the contaminated water sample. If Sr-90 is to be separated from the sample, the radium strip solution is further processed by contacting it with a strontium selective extraction chromatographic resin.

One such resin is “Sr Resin,” which is a non-ionic acrylic ester polymer bead resin (60 percent to 70 percent) having a coating layer thereon of a substituted crown ether such as 4,4'(5')di-t-butylcyclohexano-18-crown-6 [bis-t-butyl-cis-dicyclohexano-18-crown-6] (20 percent to 25 percent) dissolved in n-octanol (5 percent to 20 percent). A water-insoluble crown ether is typically substituted with two 6-membered ring structures and has a solubility in distilled deionized water of about $10^{-4}$M or less. “Sr Resin” is commercially available from Eichrom Industries, Inc. Contact of the radium strip solution with the Sr Resin binds the strontium to the resin, thus leaving the strip solution with essentially only radium and barium cations therein.

Figure 1C:
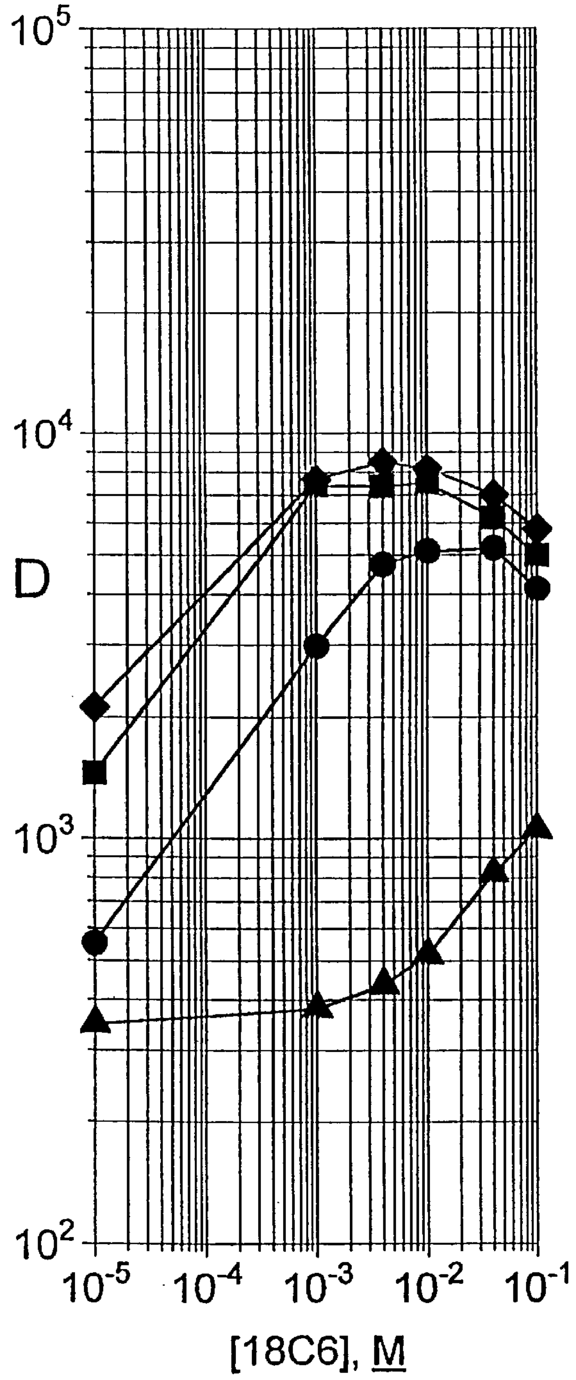
Figure 1D:
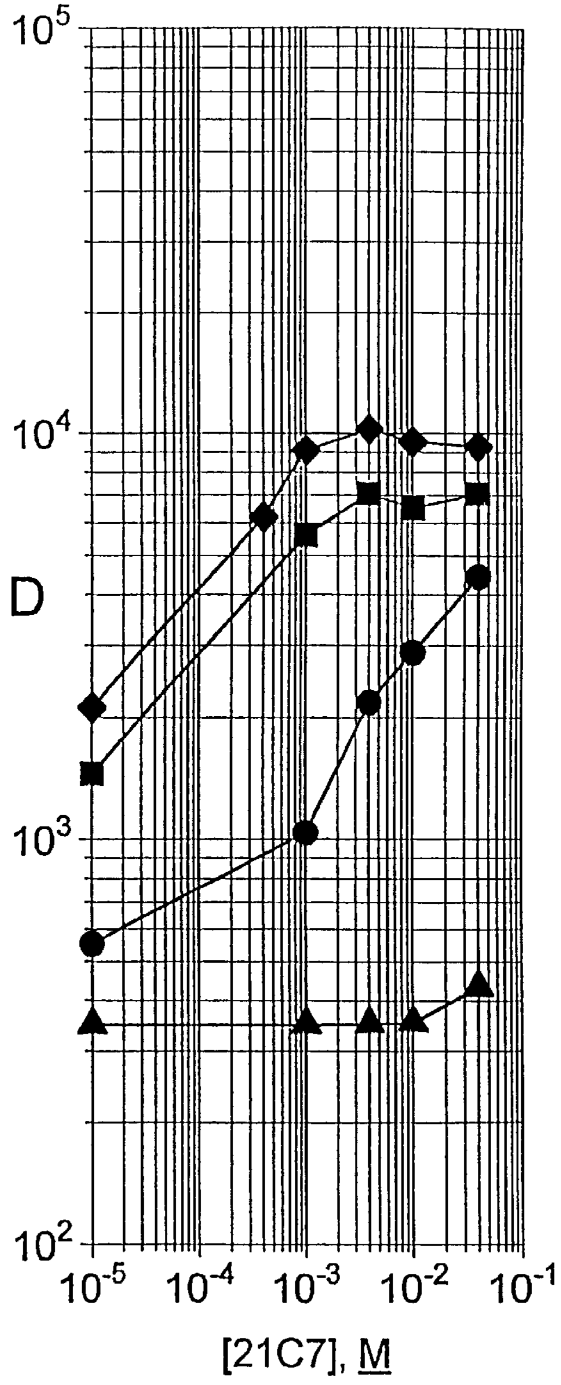
Figure 1E:
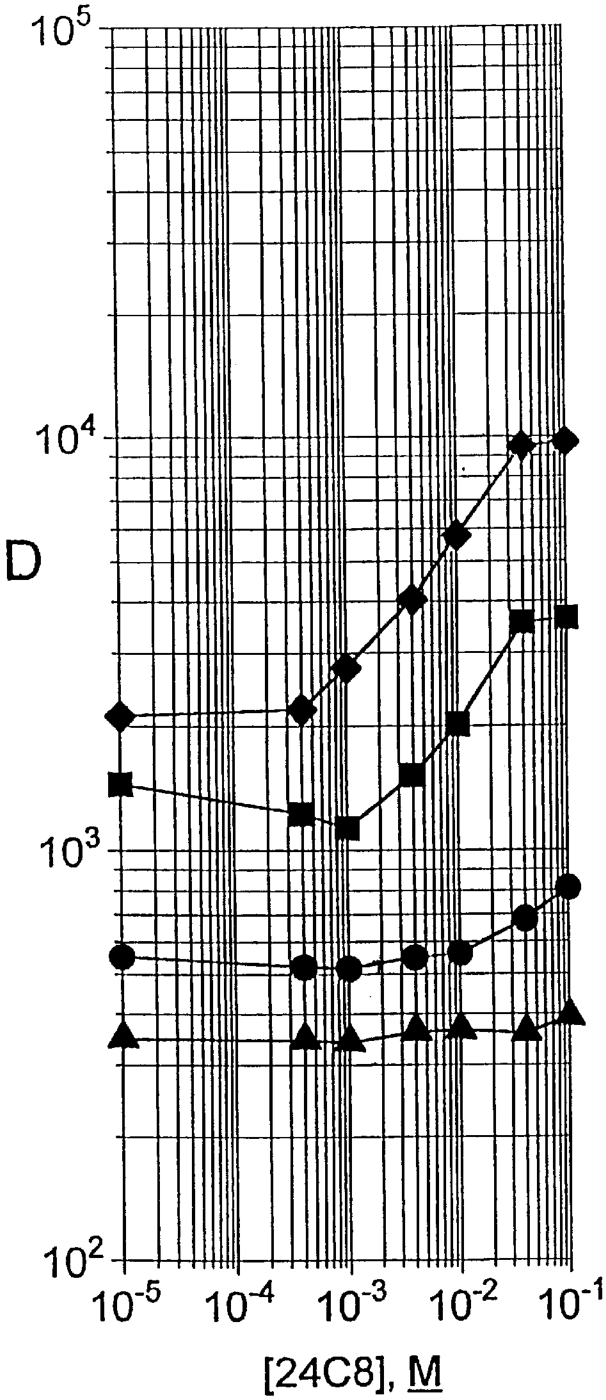
Figure 1F:
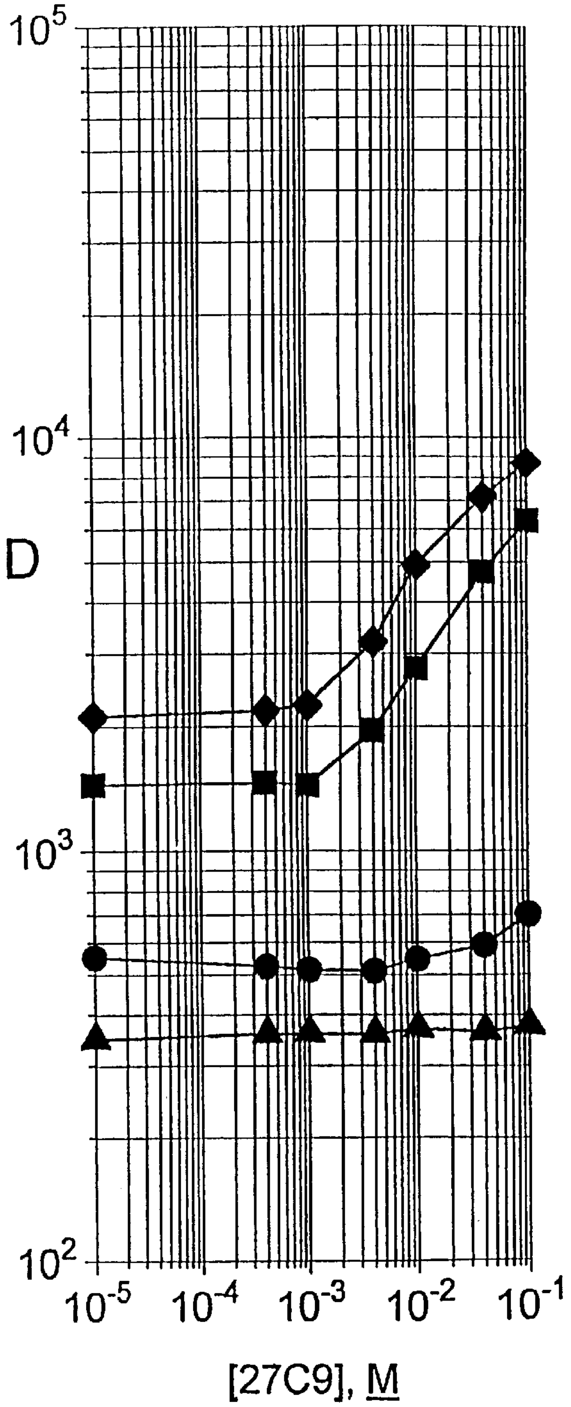
Figure 1G:
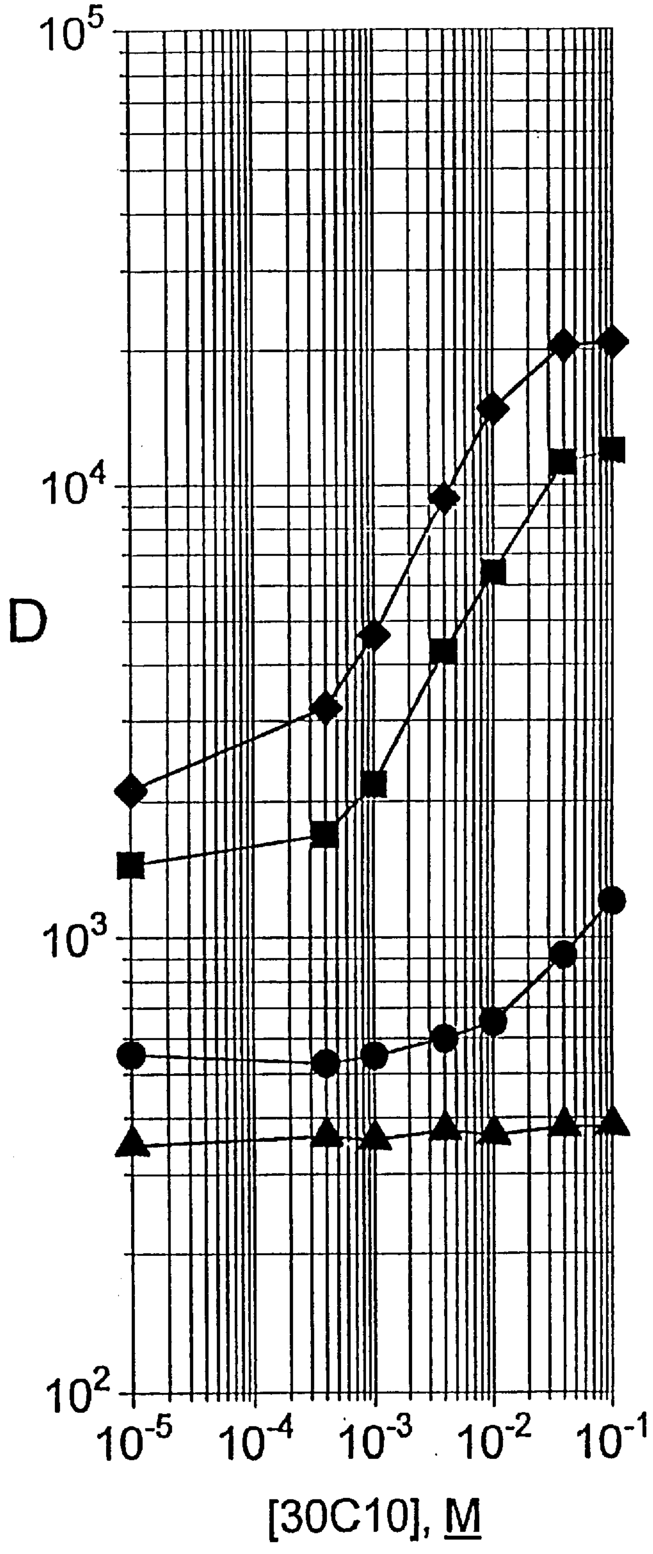
Figure 2A:
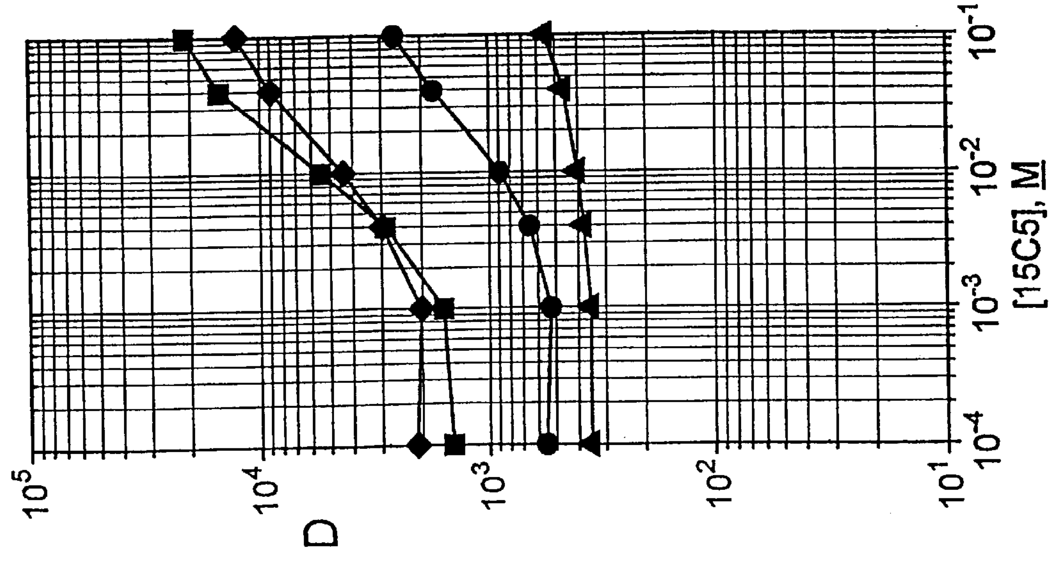
FIGS. 2A–2C are graphic illustrations showing the dependence of the sorption of the cations illustrated in FIG. 1 in a solid-liquid phase separation system as in FIGS. 1A–1G at hydrochloric acid concentrations of 0.5M. 1.0M and 2.0M (2A, 2B and 2C, respectively), on the concentration of 15C5 in the aqueous liquid phase.
Figure 2B:
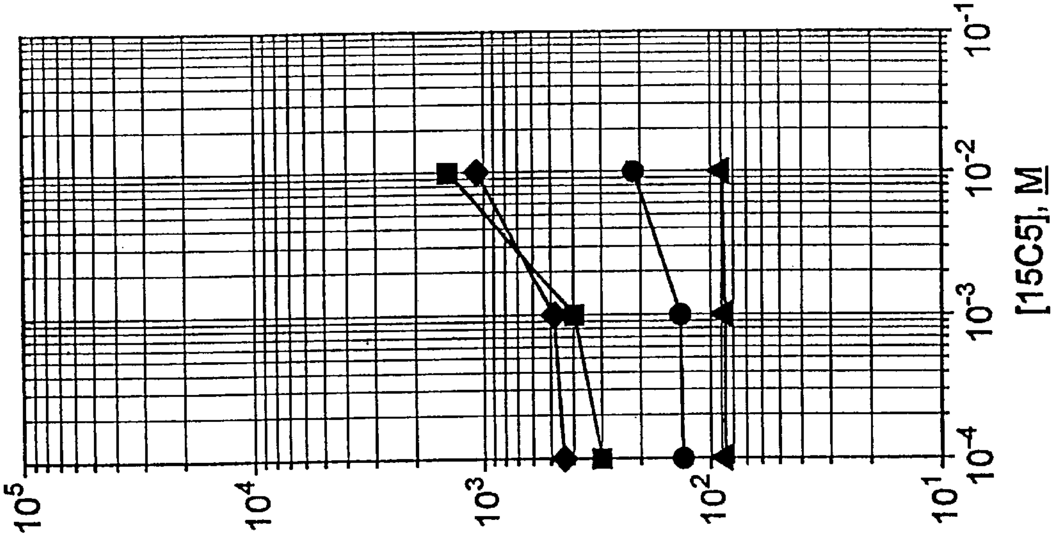
Figure 2C:
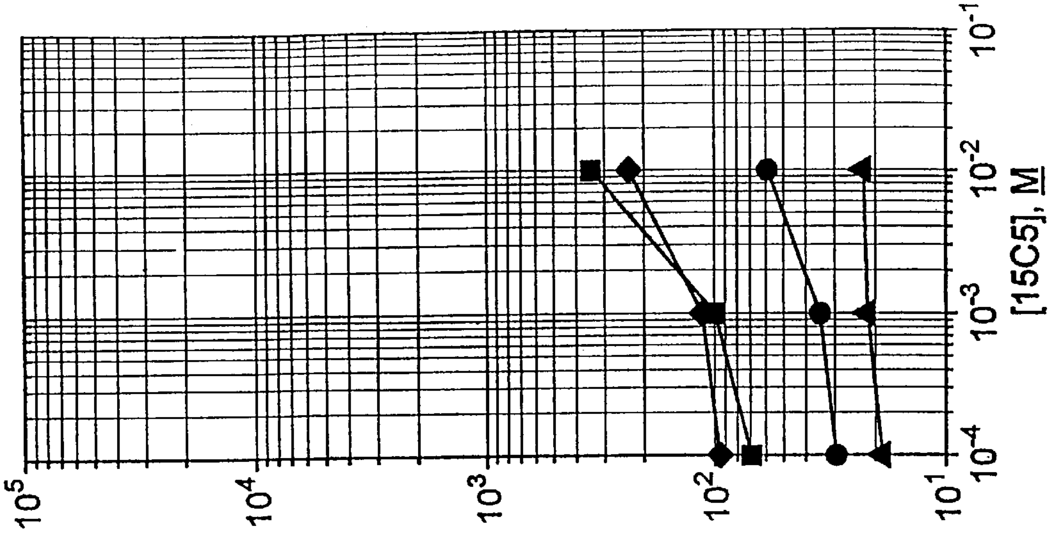
Figures 3A, 3B, 3C:
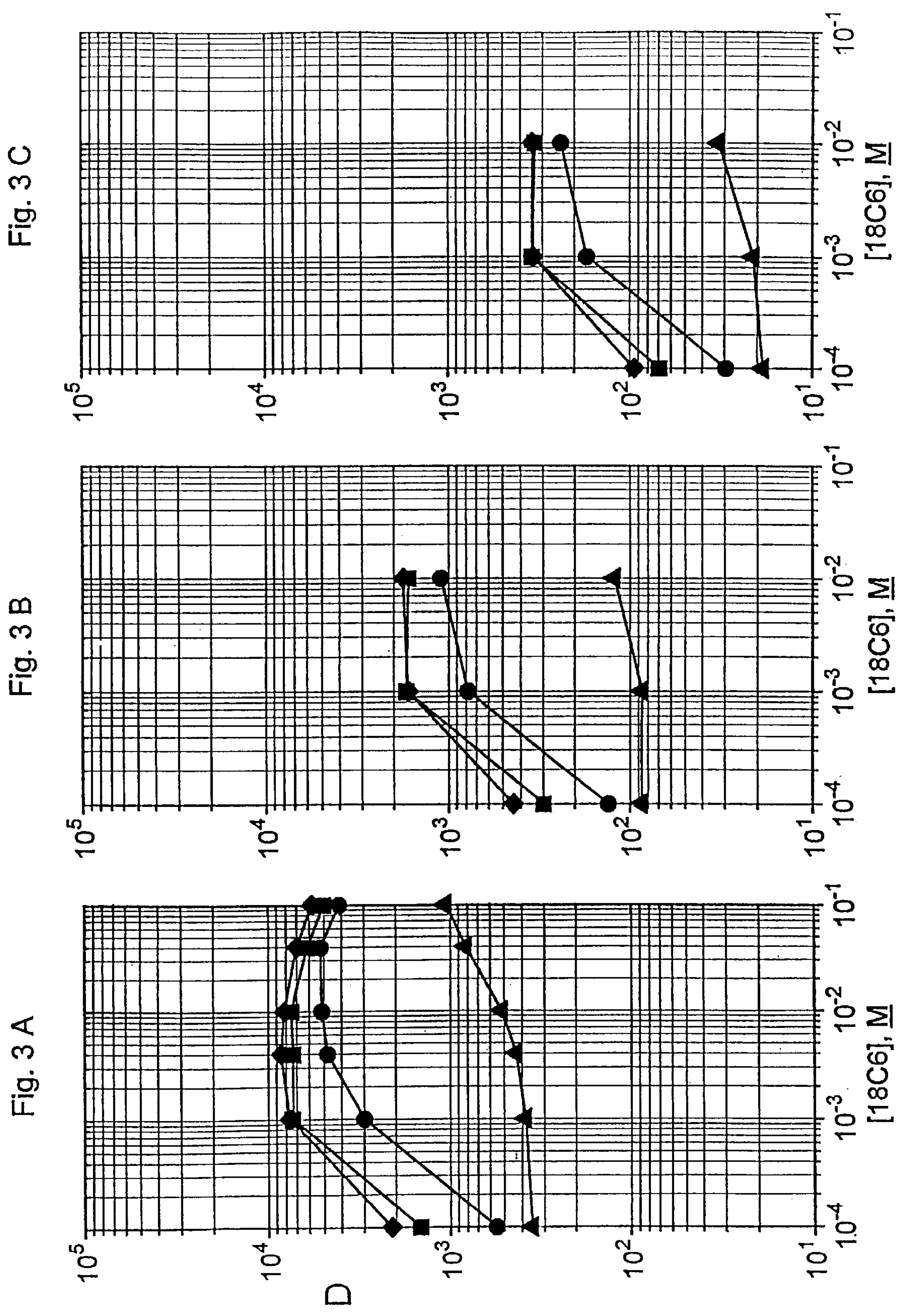
FIGS. 3A–3C are graphic illustrations of data similar to those shown in FIGS. 2A–2C taken in a separation system in which the crown ether is 18C6.

FIGS. 1A–1G, illustrate the uptake or sorption of radium, barium, strontium and calcium cations in a solid-liquid phase separation from solutions of seven different crown ethers (12C4, 15C5, 18C6, 21C7, 24C8, 27C9 and 30C10, respectively) in 0.5M hydrochloric acid as liquid phase with Bio-Rad® AG 50W-X8 ion exchange resin as solid phase. Data are provided as distribution values (D) relative to the concentration of the crown ether. As can be seen from the figures, addition to the aqueous phase of even relatively small amounts of crown ether (about $10^{-3}$M to about $10^{-1}$M) brings about a substantial and unexpected increase in $D_{Ba}$ and $D_{Ra}$ values relative to $D_{Sr}$ and $D_{Ca}$. As shown in FIG. 1C, a pronounced effect is observed on $D_{Ba}$ and $D_{Ra}$ in as little as $10^{-3}$M 18C6 crown ether. As seen in FIG. 1G when 30C10 is used, there is a greater increase in selectivity of the resin for radium and barium over strontium and calcium cations that occurs at concentrations too high to be practical.

FIGS. 2A–C and 3A–C show the influence on the sorption of radium, barium, strontium and calcium cations at varying concentrations of aqueous hydrochloric acid using 15C5 and 18C6, respectively, and the Bio-Rad® AG 50W-X8 ion exchange resin as solid phase. As is apparent from the figures, at the lower acid concentrations, the ion-exchange resin exhibits increased affinity for; i.e., sorption of the alkaline earth cations, whereas the higher acid concentrations favor elution of the same cations.

Figures 4A, 4B, 4C:
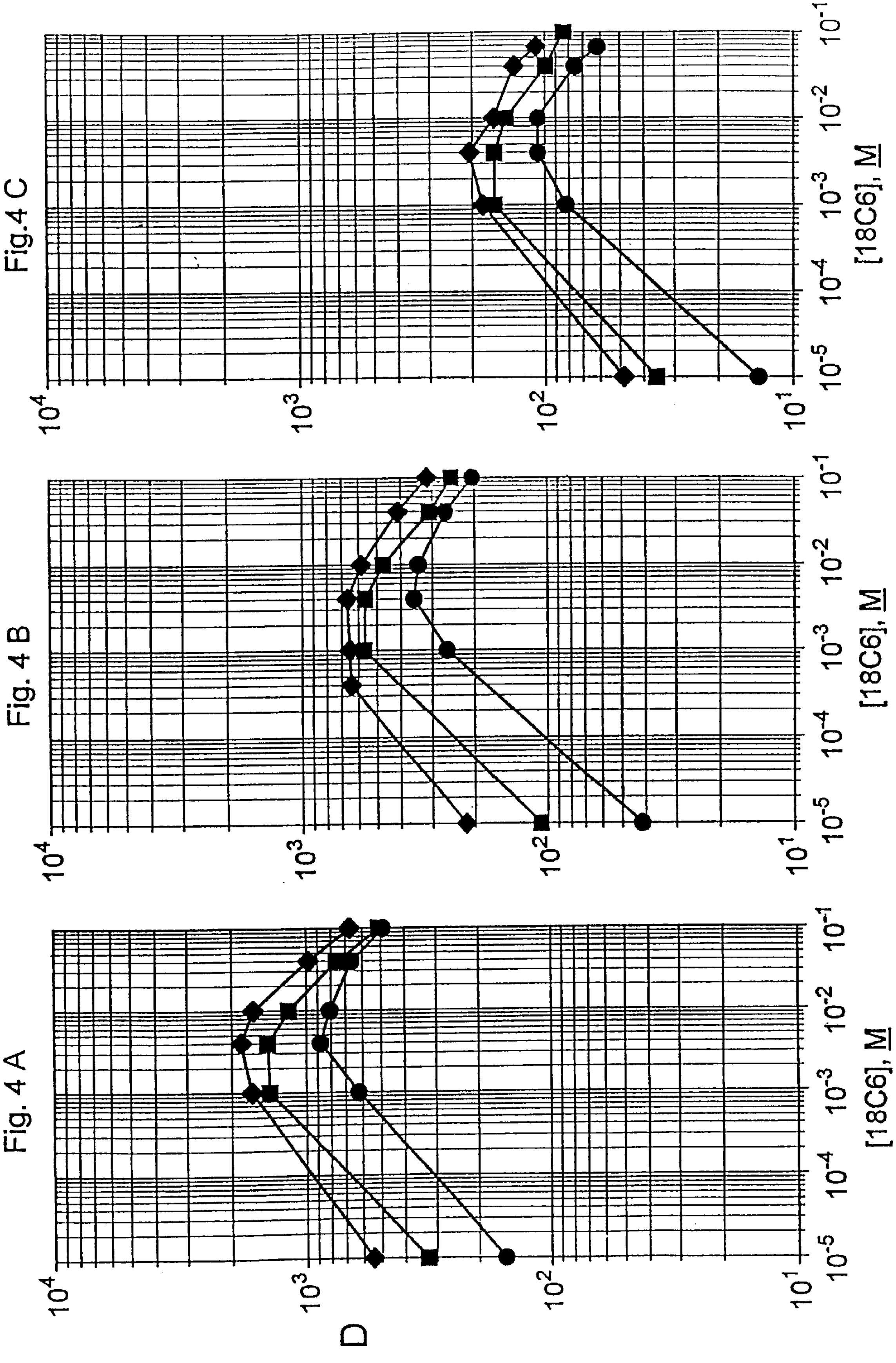
FIGS. 4A–4C are graphic illustrations of data similar to those shown in FIGS. 3A–3C, in a separation system in which the resin used as the solid phase is Bio-Rad® AG 50W-X8 in the $Ca^+$ form and the selected crown ether in the aqueous liquid phase is 18C6.

FIGS. 4A–4C illustrate the efficacy of the present process even in the presence of high concentrations of calcium cations. The uptake of radium cations (diamonds), barium cations (squares) and strontium cations (circles) is illustrated in solid-liquid phase extraction systems, having an aqueous phase that includes various concentrations of 18C6 (shown on the abscissa) at hydrochloric acid concentrations of 0.5M, 1.0M and 2.0M in FIGS. 4A, 4B, and 4C, respectively. The resin used in this study was the aforementioned BioRad® AG 50W-X8 resin. However, the resin was in the $Ca^+$ form; i.e., essentially saturated with calcium cations. Nevertheless, it is apparent from FIGS. 4A–4C and from a comparison of those data with those shown in FIGS. 3A–3C, that the increased calcium concentrations in these systems have only a slight adverse impact on the sorption of radium, strontium and barium cations. In fact, the data of FIG. 4A shows that even with complete saturation of the resin with an interfering ion ($Ca^{2+}$), the uptake of radium and barium cations by the resin is still significant, and is sufficiently high to be of utility in an analytical scheme.

As discussed previously, the present process can also be carried out using a liquid-liquid exchange medium. Specifically, the process includes the use of an exchange medium comprising a strong acid-based cation exchange medium, such as an organophilic sulfonic acid dissolved in an organic diluent, for removing the large alkaline earth cations from the aqueous sample. One such organophilic sulfonic acid is the aforementioned dinonylnaphthalenesulfonic acid (HDNNS). Exemplary of the organic diluents that can be used for carrying the organophilic sulfonic acid for the present liquid-liquid extraction process are xylenes, such as o-xylene, other alkylated benzenes such as diisopropylbenzene and diethylbenzene and mixtures of any of various well-known tri-$C_3$–$C_6$ alkyl neutral organophosphorus ester extractants, such as tributylphosphate (TBP), and a paraffinic hydrocarbon. It has been observed that the water-soluble crown ethers in contact with the water-immiscible solvent distribute between the two phases; i.e., the aqueous phase and the organic phase.

In conducting the liquid-liquid phase studies, the distribution and concentration level of the radioactive component between o-xylene solutions of HDNNS alone and in the presence of TBP, and aqueous solutions of appropriate composition were measured first by twice pre-equilibrating an aliquot of the organic solution with an equal volume of the aqueous solutions without the radioactive component. A fresh aliquot of the aqueous phase was then spiked with a small quantity of the radioactive component (added as a radiotracer for experimental purposes) and the two phases were vortexed for about five minutes to achieve equilibrium. Radium-223 (Ra-223), barium-133 (Ba-133), strontium-85 (Sr-85) and calcium-45 (Ca-45) were used as radiotracers for carrying out the studies described herein.

The solution was then centrifuged to promote phase separation and aliquots of both phases were taken for counting. Counting of the samples was performed using a Packard Cobra Autogamma counter for the Sr-85 and Ba-133, and using liquid scintillation on a Packard Model 2000 CA counter for the Ca-45 and Ra-223. Samples containing Ra-223 were counted after establishment of secular equilibrium, which required several hours based on the half-life of lead-211 (36.1 minutes). The reproducibility of the distribution ratio (D) measurements was within about 5 percent.

Figure 5B:
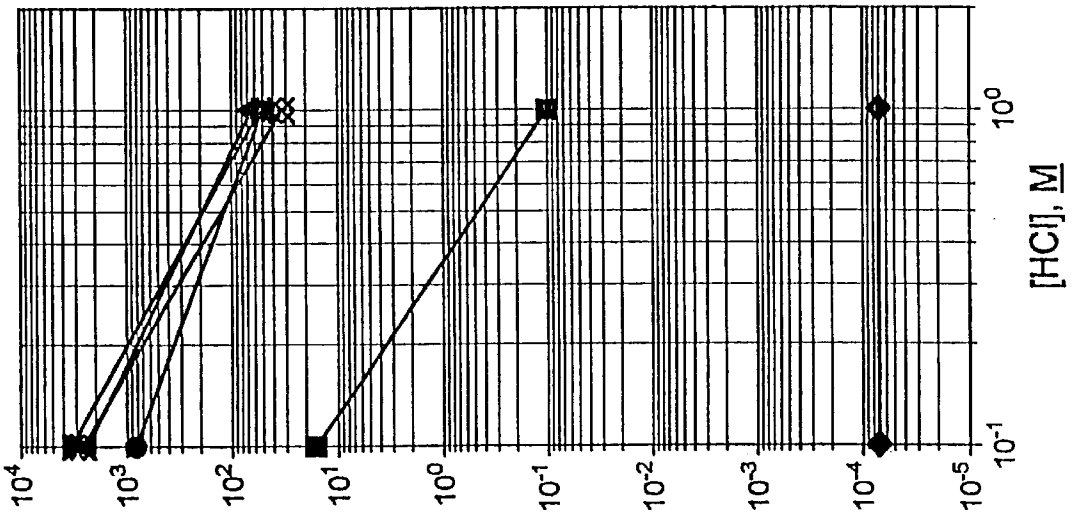
FIGS. 5A and 5B are graphic illustrations of the distribution values of radium cations in a liquid-liquid phase separation system in which the aqueous phase has hydrochloric acid concentrations of 0.1M or 1.0M (abscissa) and various concentrations of 18C6 (FIG. 5A) or 21C7 (FIG. 5B) crown ether (CE), and the organic phase is 0.01M dinonylnaphthalenesulfonic acid (HDNNS) in o-xylene. The figures include data for systems containing HDNNS alone (without the crown ether, squares), systems of crown ether alone (without the HDNNS, diamonds), and separation systems containing 0.01M HDNNS along with $4\times10^{-4}$M CE (circles), $1\times10^{-3}$M CE (triangles), $4\times10^{-3}$M CE (inverted triangles) and $1\times10^{-2}$M CE (X with open diamonds)
Figure 5A:
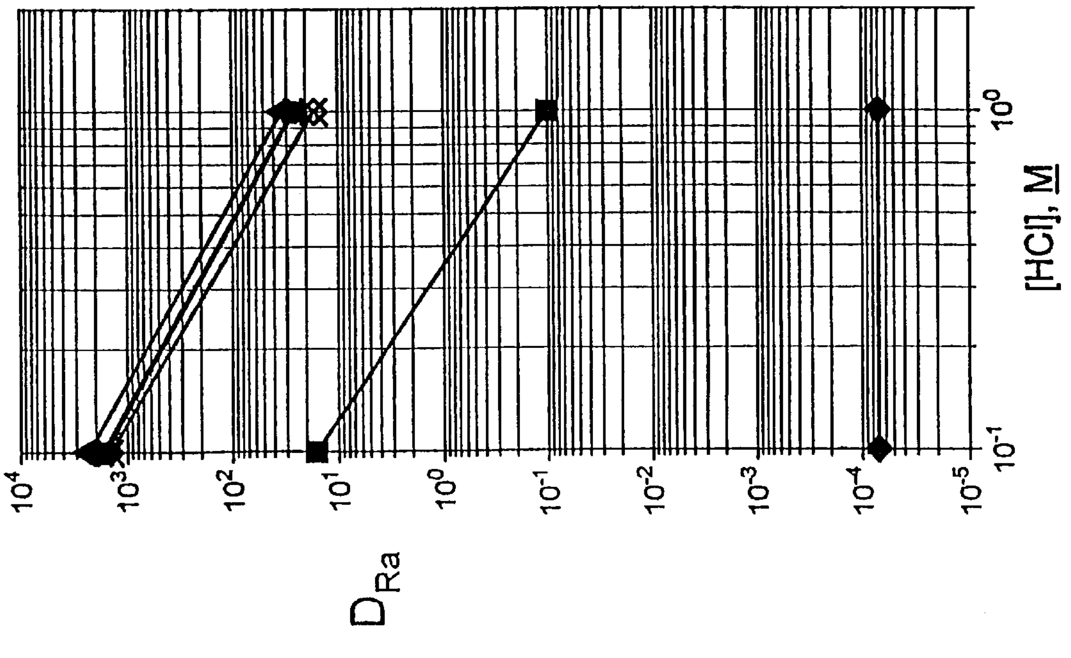

FIGS. 5A and 5B illustrate the distribution ratio data for radium in two-phase systems including crown ether (CE) in an aqueous acidic phase, and 0.01M HDNNS in an o-xylene phase. The distribution ratio, D, is defined as the ratio of the concentration of the metal species in the organic phase to the concentration of the metal species in the aqueous phase. Also shown in these figures is the distribution data for the metal species with the crown ethers alone (without the HDNNS) as the lowest set of data points (diamonds), and the distribution data for the metal species for HDNNS alone (without the crown ethers) as the next higher set of data points (squares) in each of FIGS. 5A and 5B.

As is readily apparent from the figures, the distribution data for the metal species in the two-phase system with HDNNS in the organic phase and crown ether in the aqueous acidic phase are at least two orders of magnitude higher than the data for the HDNNS system alone, and at least five orders of magnitude higher than the data for the crown ether system alone. The uptake of the metal species is shown as a function of the hydrochloric acid concentration of the aqueous phase. As is apparent from the data, lower acid concentrations favor partitioning of the metal species from the aqueous phase to the organic (extractant) phase. Moreover, the magnitude of the increase in the distribution data of the metal species to the organic phase in the systems that include both HDNNS in the organic phase and the crown ether in the aqueous phase indicates that the addition of the crown ether to the aqueous phase produces a synergistic effect in the uptake of the metal species by the extraction medium.

Figure 6B:
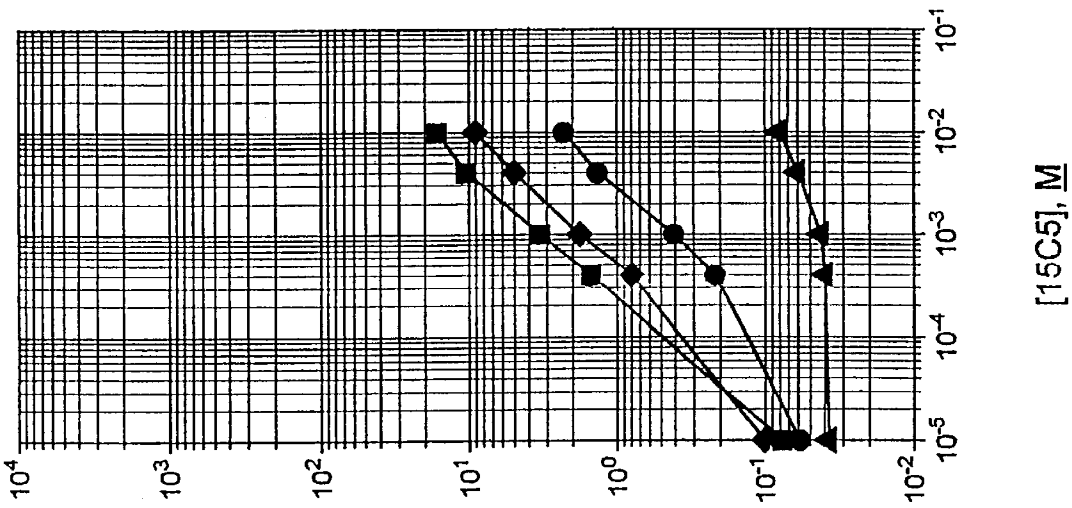
FIGS. 6A and 6B are graphic illustrations of the distribution value (D) of radium, barium, strontium, and calcium cations (as in FIG. 1) in a liquid-liquid separation system wherein the aqueous phase has hydrochloric acid concentrations of 0.1M (FIG. 6A) or 1.0M (FIG. 6B) with various concentrations of 15C5 crown ether (CE) shown on the abscissa, and the organic phase is 0.01M dinonylnaphthalenesulfonic acid (HDNNS) in o-xylene.
Figure 6A:
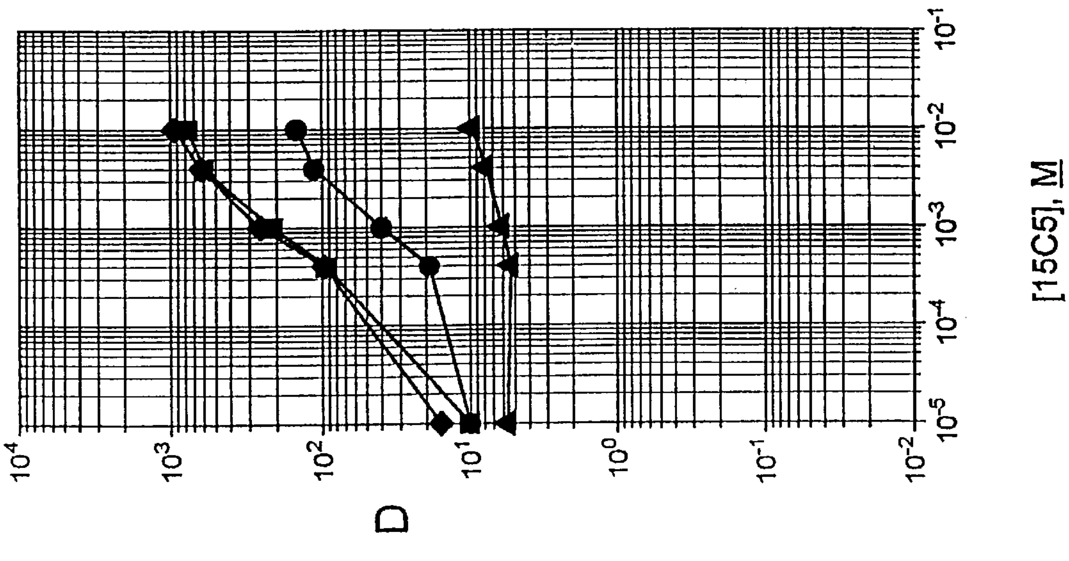

More importantly, FIGS. 6A and 6B illustrate the effect of the acid concentration in the aqueous phase on the metal species uptake. FIG. 6A shows the distribution data for the various metal species in an aqueous phase having a hydrochloric acid concentration of 0.1M and having varying concentrations of 15C5, between about $10^{-5}$M and about $10^{-2}$M. Likewise, FIG. 6B shows the distribution data for the various metal cation species in an aqueous phase having a hydrochloric acid concentration of 1.0M and having varying concentrations of 15C5, between about $10^{-5}$M and about $10^{-2}$M.

A comparison of the data shown in FIG. 6A with those shown in FIG. 6B illustrates that lower acid concentrations favor uptake of the metal species by the extraction medium whereas higher acid concentrations favor elution. These data also illustrate that the enhancement of radium cation sorption induced by crown ether addition is observed at a variety of acid concentrations.

Figure 7B:
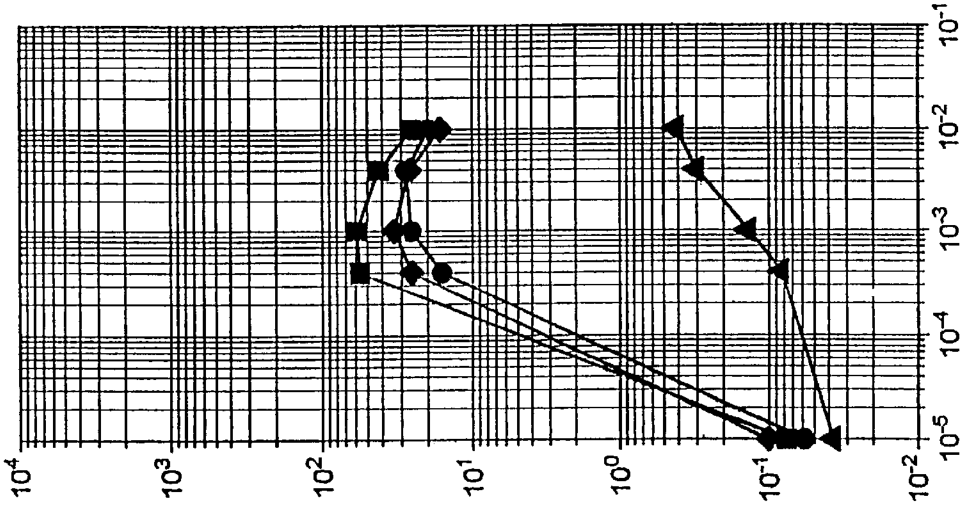
FIGS. 7A and 7B are graphic illustrations of separation systems similar to those shown in FIGS. 6A and 6B in which the crown ether is 18C6.
Figure 7A:
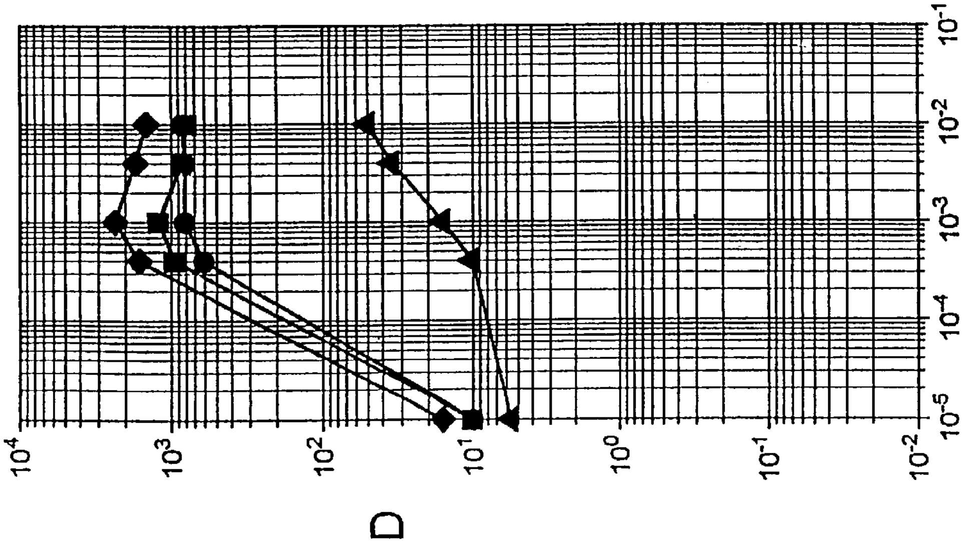

FIGS. 7A and 7B show the distribution data for two-phase systems similar to those of FIGS. 6A and 6B, except that an 18C6 crown ether was added to the aqueous phase rather than a 15C5 crown ether. Like the data of FIGS. 6A and 6B, the data of FIGS. 7A and 7B show that the uptake of the metal cations by the extraction medium is adversely effected by an increase in acid concentration and that radium cation sorption is enhanced by crown ether addition at different acid concentrations.

A comparison of the data of FIGS. 6A and 6B with that of FIGS. 7A and 7B shows increased selectivity by the exchange medium for radium and barium over strontium when the crown ether is 15C5. In fact, at crown ether concentrations between about $5\times10^{-4}$ and about $10^{-2}$, there is about a five-fold increase in selectivity for radium and barium over strontium. In addition, that enhancement does not require a particular acidity.

Figure 8B:
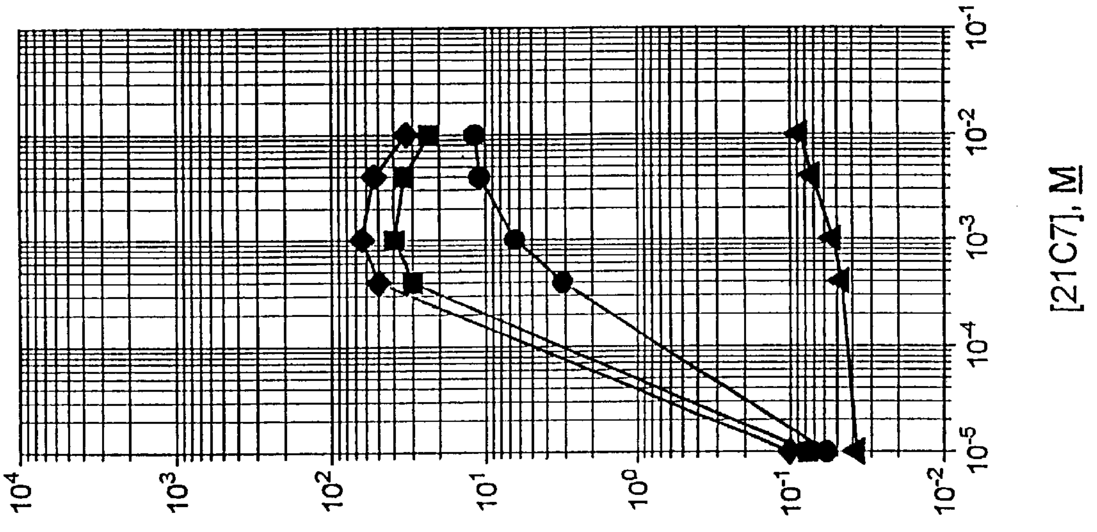
FIGS. 8A and 8B are graphic illustrations of separation systems similar to those shown in FIGS. 6A and 6B in which the crown ether is 21C7.
Figure 8A:
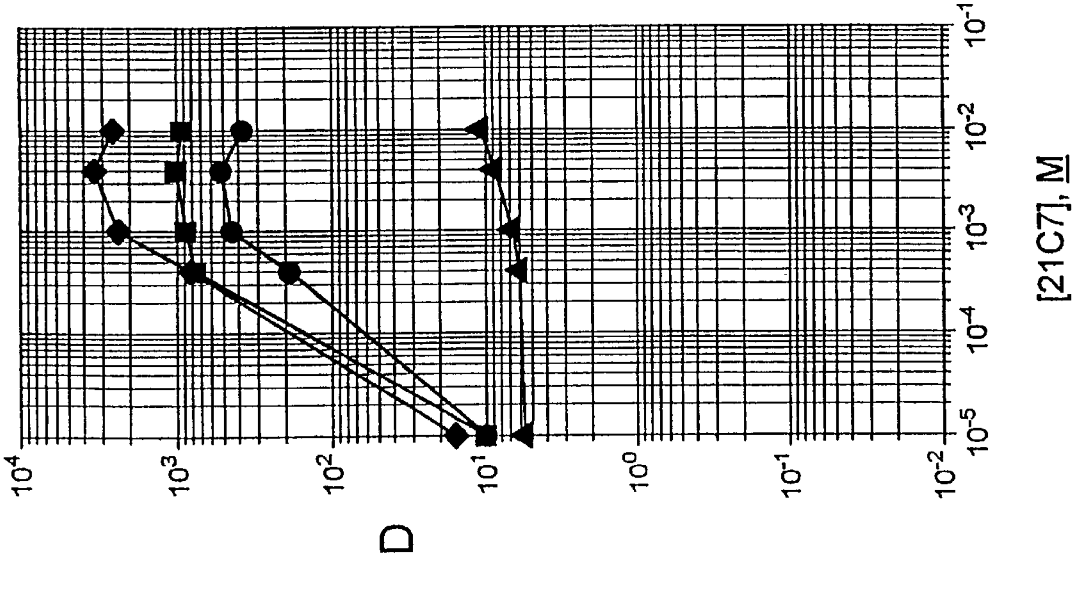

FIGS. 8A and 8B show the distribution data for two-phase systems similar to those of FIGS. 6A and 6B, and FIGS. 7A and 7B, except that a 21C7 crown ether was added to the aqueous phase rather than a 15C5 or 18C6 crown ether. Like the data of the previous figures, the data of FIGS. 8A (0.1M $[H^+]$ concentration) and 8B (1.0M $[H^+]$ concentration) show that the uptake of the metal cations by the extraction medium is adversely effected by an increase in acid concentration, and that radium cation sorption is enhanced by addition of the crown ether over a ten-fold change in acid concentration.

A comparison of the data of FIGS. 8A and 8B with that of FIGS. 6A and 6B and FIGS. 7A and 7B shows an extreme increase in selectivity by the exchange medium for radium over calcium when the crown ether is 21C7. In fact, at crown ether concentrations between about $5\times10^{-4}$ and about $10^{-2}$M, there is about a one thousand-fold increase in selectivity for radium over calcium. This is extremely beneficial in that calcium cations are the predominant alkaline earth cations in most water samples.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A process for preconcentrating and separating radium from a contaminated solution containing at least water and radium comprising the steps of:

(a) adding a quantity of a water-soluble macrocyclic polyether to the contaminated solution to form a combined solution;

(b) adding a sufficient amount of an acid to said combined solution to form an acidic combined solution having an $[H^+]$ concentration of about 0.5M; and (c) contacting said acidic combined solution with a sulfonic acid-based strong acid cation exchange medium having a plurality of binding sites thereon to bind said radium thereto and to form a radium-depleted solution; and (d) separating said radium-depleted solution from said strong acid cation exchange medium.

2. The process for preconcentrating and separating radium from a contaminated solution in accordance with claim 1 wherein said macrocyclic polyether is added to the contaminated solution to form a combined solution having a macrocyclic polyether concentration of about $10^{-3}$M to $10^{-1}$M.

3. The process for preconcentrating and separating radium from a contaminated solution in accordance with claim 1 including adding a chelating agent to said cation exchange medium and said acidic combined solution.

4. The process for preconcentrating and separating radium from a contaminated solution in accordance with claim 1 including rinsing said cation exchange medium with water or a solution of hydrochloric acid after said cation exchange medium is contacted with said acidic combined solution.

5. The process for preconcentrating and separating radium from a contaminated solution in accordance with claim 1 including stripping said radium from said cation exchange medium.

6. The process for preconcentrating and separating radium from a contaminated solution in accordance with claim 5 wherein said radium is stripped from said cation exchange medium with a nitric acid solution.

7. The process for preconcentrating and separating radium from a contaminated solution in accordance with claim 6 wherein said nitric acid solution has a concentration of about 4.0M.

8. The process for preconcentrating and separating radium from a contaminated solution in accordance with claim 1 wherein said sulfonic acid-based strong acid cation exchange medium is a solid phase sulfonic acid-based ion-exchange resin.

9. The process for preconcentrating and separating radium from a contaminated solution in accordance with claim 1 wherein said sulfonic acid-based strong acid cation exchange medium is an organophilic sulfonic acid dissolved in an organic diluent.

10. The process for preconcentrating and separating radium from a contaminated solution in accordance with claim 9 wherein said organophilic sulfonic acid is dinonylnaphthalenesulfonic acid.

11. The process for preconcentrating and separating radium from a contaminated solution in accordance with claim 9 wherein said organic diluent is a xylene or other alkyl benzene, or a mixture of a paraffinic hydrocarbon and a neutral organophosphorus extractant.

12. The process for preconcentrating and separating radium from a contaminated solution in accordance with claim 1 wherein said macrocyclic polyether is 15-crown-5, 18-crown-6, 21-crown-7 or 30-crown-10.

* * * * *